(12) United States Patent
Hikita et al.

(10) Patent No.: US 7,664,358 B2
(45) Date of Patent: Feb. 16, 2010

(54) OPTICAL WAVEGUIDE FILM AND MANUFACTURING METHOD THEREOF

(75) Inventors: Takami Hikita, Osaka (JP); Masayuki Hodono, Osaka (JP); Kunio Nagasaki, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 12/222,262

(22) Filed: Aug. 6, 2008

(65) Prior Publication Data
US 2009/0041416 A1 Feb. 12, 2009

(30) Foreign Application Priority Data
Aug. 6, 2007 (JP) ............... 2007-204487

(51) Int. Cl.
*G02B 6/10* (2006.01)
*G02B 6/00* (2006.01)

(52) U.S. Cl. ...................... 385/130; 385/134

(58) Field of Classification Search ............ None
See application file for complete search history.

(56) References Cited

U.S. PATENT DOCUMENTS

| | | | | |
|---|---|---|---|---|
| 5,296,277 A | * | 3/1994 | Wilson et al. ............ 428/40.2 |
| 5,589,246 A | * | 12/1996 | Calhoun et al. ............ 428/120 |
| 5,902,435 A | * | 5/1999 | Meis et al. ............... 156/230 |
| 6,579,398 B1 | | 6/2003 | Ogawa | |
| 7,097,892 B2 | * | 8/2006 | Sano ...................... 428/40.1 |
| 2002/0018633 A1 | | 2/2002 | Imaizumi | |
| 2004/0022499 A1 | | 2/2004 | Shimizu et al. | |
| 2006/0018615 A1 | | 1/2006 | Imai | |
| 2006/0098926 A1 | | 5/2006 | Shelnut et al. | |
| 2006/0133766 A1 | | 6/2006 | Shelnut et al. | |

FOREIGN PATENT DOCUMENTS

| | | |
|---|---|---|
| EP | 0426 441 | 5/1991 |
| EP | 1338 904 | 8/2003 |
| JP | 2002-116334 | 4/2002 |
| JP | 2003-114353 | 4/2003 |

* cited by examiner

*Primary Examiner*—Omar Rojas
(74) *Attorney, Agent, or Firm*—Jean C. Edwards, Esq.; Akerman Senterfitt

(57) ABSTRACT

An optical waveguide film includes a film including a clad layer and a core layer covered by the clad layer; an adhesive layer formed on at least one surface of the film; and a plurality of projection portions formed on a surface of the adhesive layer and arranged at spaced intervals to one another.

12 Claims, 3 Drawing Sheets

(a)

(b)

(c)

(d)

(a)

(b)

(c)

(d)

(e)

OPTICAL WAVEGUIDE FILM AND MANUFACTURING METHOD THEREOF

CROSS REFERENCE TO RELATED APPLICATION

This application claims priority from Japanese Patent Application No. 2007-204487, filed Aug. 6, 2007, the content of which is herein incorporated by reference in its entirety.

BACKGROUND OF THE INVENTION

1. Field of the Invention

The present invention relates to an optical waveguide film and a manufacturing method thereof.

2. Description of Related Art

Conventionally, optical waveguide films used to optically connect between a plurality of optical elements provided on an optical substrate are known. Such optical waveguide film needs to be precisely positioned to the optical substrate when arranged thereon in order to secure an optical path.

As the optical waveguide film, for example, there has been proposed an optical wiring film made of a plurality of optical wiring layers and formed on a silicon substrate via a curable adhesive layer (cf. for example, Japanese Unexamined Patent Publication No. 2002-116334). In this proposal, a liquid curable adhesive layer (not yet cured) is first coated onto an optical wiring film, the optical wiring film is then positioned to a silicon substrate via the liquid curable adhesive layer thus coated, and subsequently, a curable adhesive layer having a desired adhesive strength is formed by curing and the optical wiring film is fixed to the silicon substrate.

SUMMARY OF THE INVENTION

However, in Japanese Unexamined Patent Publication No. 2002-116334, when the optical wiring film is fixed to the silicon substrate, the liquid curable adhesive layer flows to a connecting portion between the optical wiring film and an optical element, which may block the optical path in the optical wiring layer.

On the other hand, use of a sheet-like adhesive layer having a high adhesive strength may eliminate the possibility of blocking the optical path because of less flowing of the adhesive layer. However, due to the higher initial adhesive strength of the adhesive layer, the optical waveguide film is fixed to the optical substrate immediately after the adhesive layer is brought into contact with the optical substrate. This immediate adhesion makes it difficult to adjust the arrangement of the optical waveguide film with respect to the optical substrate during positioning. As a result, the optical waveguide film is difficult to accurately position to the optical substrate.

An object of the present invention is to provide an optical waveguide film having high connection reliability, capable of ensuring easy peeling and excellent positioning accuracy during positioning and capable of securely fixing a film after positioning, and a manufacturing method thereof.

The optical waveguide film of the present invention includes a film including a clad layer and a core layer covered by the clad layer; an adhesive layer formed on at least one surface of the film; and a plurality of projection portions formed on a surface of the adhesive layer and arranged at spaced intervals to one another.

Further, in the optical waveguide film of the present invention, it is preferable that the projection portions are aligned and arranged.

Further, in the optical waveguide film of the present invention, it is preferable that the adhesive layer is formed of an acrylic adhesive composition.

Further, in the optical waveguide film of the present invention, it is preferable that the adhesive layer has a storage modulus at 25° C. of 0.01 to 1.0 MPa.

Further, in the optical waveguide film of the present invention, it is preferable that the adhesive layer has a thickness of 10 μm or more.

Further, in the optical waveguide film of the present invention, it is preferable that an initial adhesive strength of the adhesive layer is 0.5 N/cm or less.

Further, in the optical waveguide film of the present invention, it is preferable that an adhesive strength after press-bonding of the adhesive layer formed with the projection portions is 1 N/cm or more.

Further, in the optical waveguide film of the present invention, it is preferable that the projection portions are formed as resins having substantially no residual tackiness.

Further, in the optical waveguide film of the present invention, it is preferable that the projection portions are formed by curing projection precursors made of a curable resin composition including a curable resin and an initiator. In such case, it is preferable that the curable resin is an epoxy resin.

Further, in the optical waveguide film of the present invention, it is preferable that each of the projection portions is formed in a generally circular shape. In such case, it is preferable that the projection portions are arranged at spaced intervals to one another, having a maximum thickness of 10 to 100 μm and a diameter of 100 to 1000 μm, and a spacing between each of the projection portions is from 2 to 10 mm.

The method for manufacturing an optical waveguide film according to the present invention includes the steps of forming a film including a clad layer and a core layer covered by the clad layer; forming an adhesive layer on at least one surface of the film; and forming a plurality of projection portions on a surface of the adhesive layer so as to be arranged at spaced intervals to one another.

According to the optical waveguide film and the manufacturing method thereof according to the present invention, when the optical waveguide film is initially adhered to an adherend, the surface of the adhesive layer formed with the projection portions is brought into contact with the adherend, so that the initial adhesive strength can be reduced. This facilitates peeling during positioning, thereby ensuring excellent positioning accuracy.

Further, when the adhesive layer is adhered to the adherend after the initial adhesion, the surface of the adhesive layer exposed from the plurality of the projection portions that are arranged at spaced intervals to one another can secure sufficient adhesive strength, so that the film can be securely fixed onto the adherend.

In addition to this, the adhesive layer is formed with a hardness that allows the surface thereof to support the projection portions, so that the flowage of the adhesive layer can be suppressed in the initial adhesion to the adherend, thereby preventing the adhesive layer from blocking the optical path in the core layer.

Therefore, during the positioning, adhesion and peeling of the film to/from the adherend are repeated to adjust the arrangement of the film with respect to the adherend, so that the positioning can be achieved with excellent positioning accuracy. In addition, after the positioning, the film can be securely fixed to the adherend and, further, excellent connection reliability can be ensured.

DETAILED DESCRIPTION OF PREFERRED EMBODIMENTS

Figure 1:
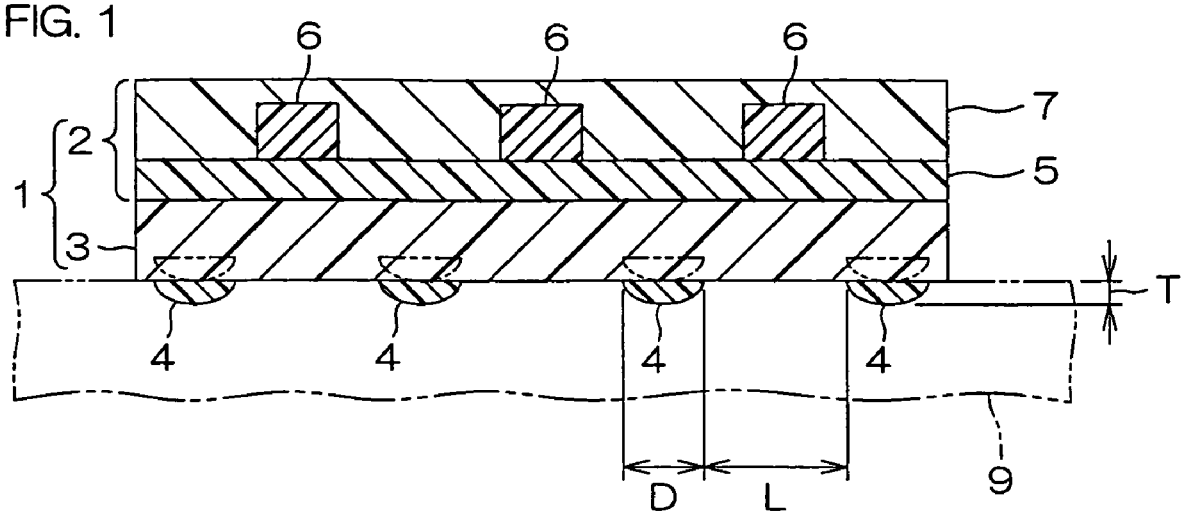
FIG. 1 is a sectional view along a widthwise direction illustrating one embodiment of an optical waveguide film according to the present invention.
Figure 2:
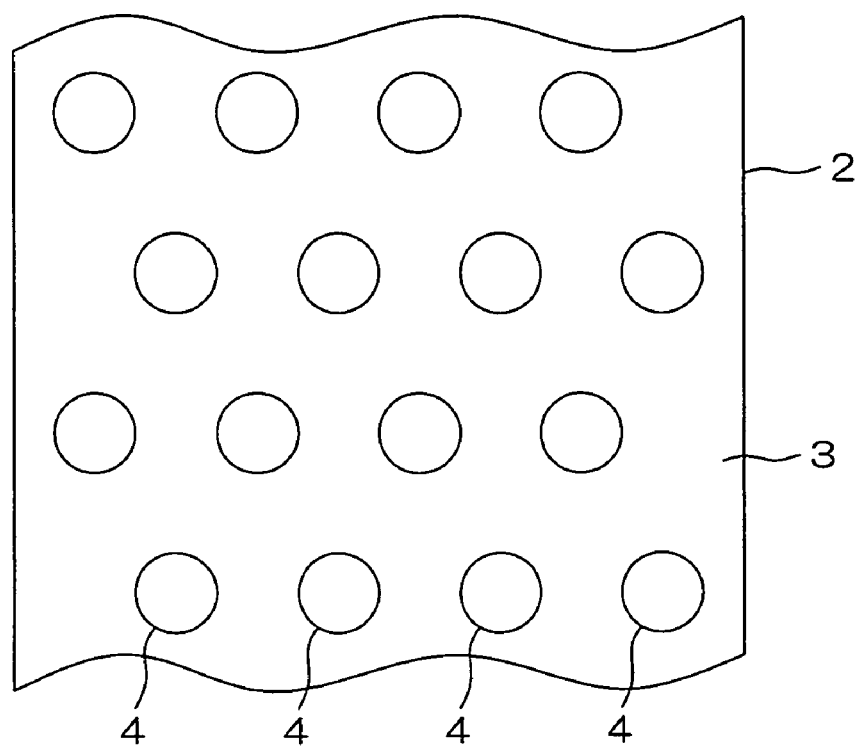
FIG. 2 is a rear view of the optical waveguide film shown in FIG. 1.
Figure 3:
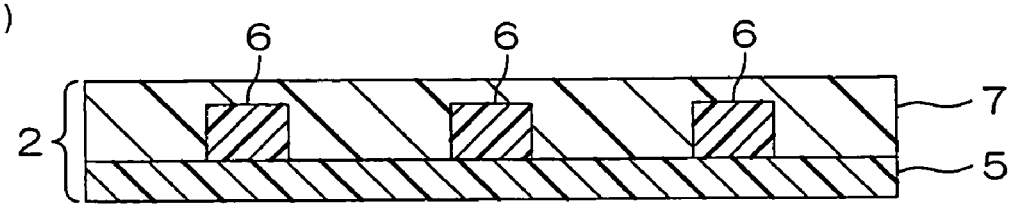
FIG. 3 is a process diagram illustrating the steps of manufacturing the optical waveguide film shown in FIG. 1, (a) showing the step of preparing a film, (b) showing the step of forming an adhesive layer on the lower surface of an under clad layer, (c) showing the step of forming projection precursors on a surface of the adhesive layer, and (d) showing the step of curing the projection precursors to form a plurality of projection portions.
Figure 3:
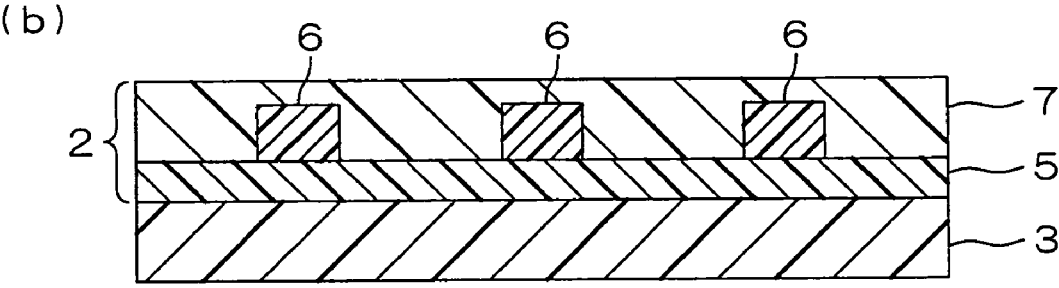
Figure 3:
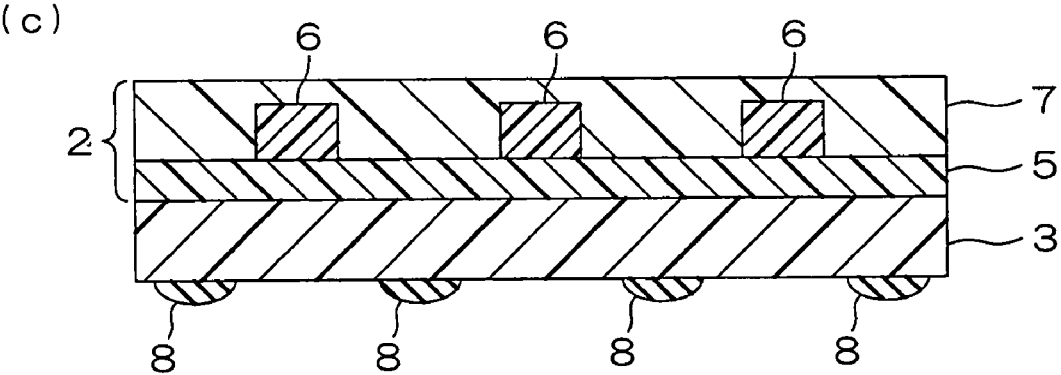
Figure 3:
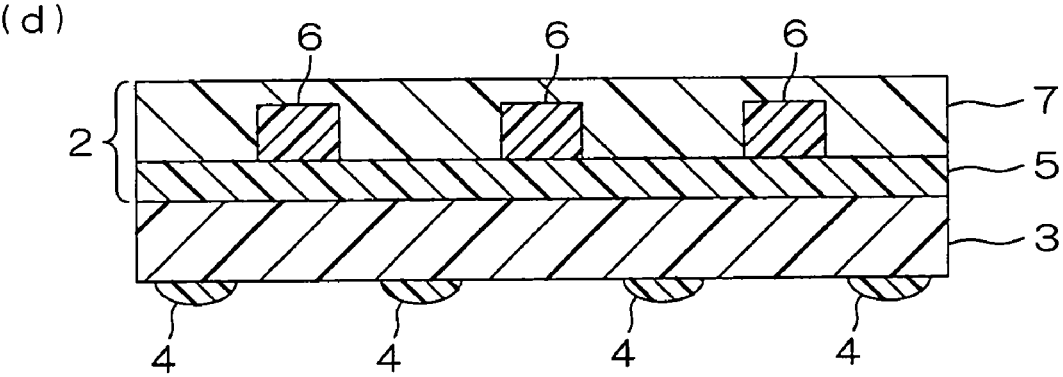
Figure 4:
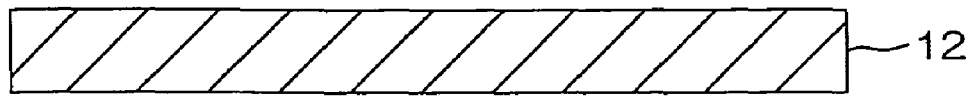
FIG. 4 is a process diagram illustrating the steps of manufacturing a film of the optical waveguide film shown in FIG. 1, (a) showing the step of preparing a substrate, (b) showing the step of forming an under clad layer on the substrate, (c) showing the step of forming a core layer on the under clad layer, (d) showing the step of forming an over clad layer on the under clad layer so as to cover the core layer, and (e) showing the step of removing the substrate.
Figure 4:
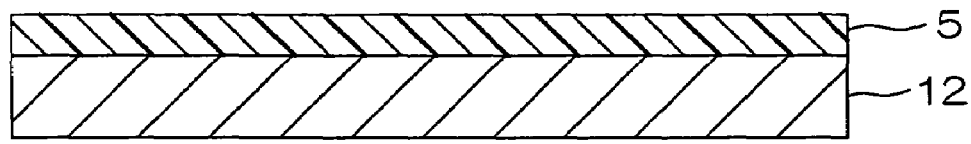
Figure 4:
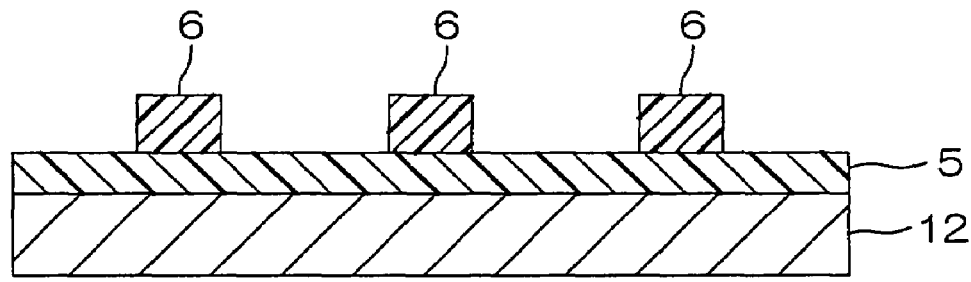
Figure 4:
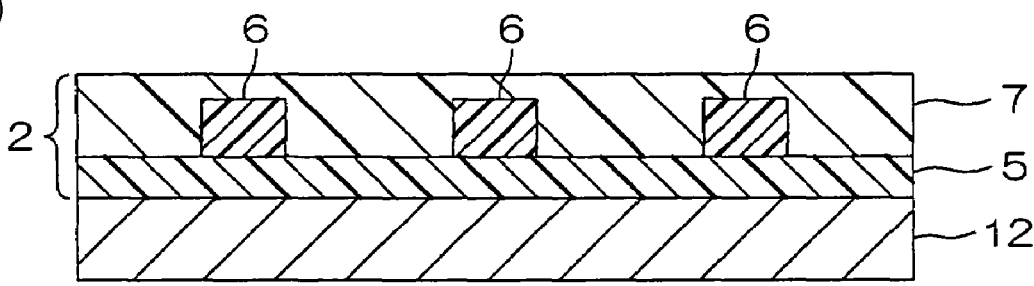
Figure 4:
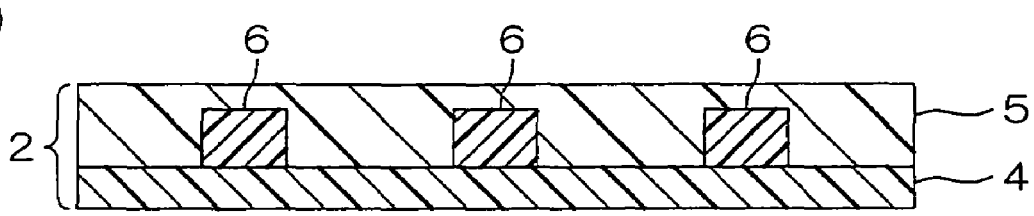

FIG. 1 is a sectional view along a widthwise direction (a direction perpendicular to a lengthwise direction) illustrating one embodiment of an optical waveguide film according to the present invention, FIG. 2 is a rear view of the optical waveguide film shown in FIG. 1, FIG. 3 is a process diagram illustrating the steps of manufacturing the optical waveguide film shown in FIG. 1, and FIG. 4 is a process diagram illustrating the steps of manufacturing a film of the optical waveguide film shown in FIG. 1.

In FIGS. 1 and 2, the optical waveguide film 1 is formed in a band shape extending in the lengthwise direction, and includes a film 2, an adhesive layer 3 and a plurality of projection portions 4.

The film 2 is an optical waveguide, which is formed so as to correspond to the outer shape of the optical waveguide film 1. The film 2 includes an under clad layer 5 serving as a clad layer and an over clad layer 7, and a core layer 6 covered by the under clad layer 5 and the over clad layer 7. More specifically, the film 2 includes an under clad layer 5, a core layer 6 formed on the under clad layer 5, and an over clad layer 7 formed on the under clad layer 5 so as to cover the core layer 6.

A plurality (3) of the core layers 6 are provided on the upper surface of the under clad layer 5, extending in the lengthwise direction and arranged in parallel at spaced intervals to one another in the widthwise direction. Both lengthwise end portions of the core layer 6 serve as connecting portions to be optically connected with a plurality of optical elements. Each of the core layers 6 is formed in a generally rectangular shape in sectional view.

The adhesive layer 3 is provided on one surface of the film 2, more specifically, on the lower surface of the under clad layer 5. Further, the adhesive layer 3 is formed with a hardness that can support the projection portions. The adhesive layer 3 has a storage modulus at 25° C. of, for example, 0.01 to 1.0 MPa. The storage modulus at 25° C. is determined as torsion storage modulus G' at 25° C. obtained by dynamic viscoelastic measurement when the temperature is increased from −20° C. to 200° C. at a rate of 5° C./min in torsion mode with a frequency of 1 Hz.

The projection portions 4 are formed on a surface of the adhesive layer 3, more specifically, on the lower surface of the adhesive layer 3. Each of the projection portions 4 is formed in a generally circular shape in rear view and in a generally semi-elliptical shape in sectional view, growing narrower in the downward direction. The projection portions 4 are aligned and arranged at spaced intervals to one another in rear view. The projection portions 4 are formed as resins having a lower tackiness (surface tack) than the adhesive layer 3, or preferably as resins having substantially no residual tackiness.

Next, a method of manufacturing the optical waveguide film 1 is described with reference to FIGS. 3 and 4.

In this method, a film 2 is first prepared, as shown in FIG. 3(a).

To prepare the film 2, first, as shown in FIG. 4(a), a substrate 12 is prepared. The substrate 12 has a plate shape, and examples of the material that may be used to form the substrate 12 include ceramic materials such as silicon and glass; metallic materials such as copper, aluminium, stainless steel and iron alloy; and resin materials such as polyimide, glass-epoxy and polyethylene terephthalate (PET). Preferable is a metallic material from the viewpoint of ease of removal to be described later. The substrate 12 has a thickness of, for example, 10 to 5000 μm, or preferably 10 to 1500 μm.

Then, in this method, as shown in FIG. 4(b), an under clad layer 5 is formed on the substrate 12.

Examples of the material that may be used to form the under clad layer 5 include resin materials such as polyimide resin, polyamide resin, silicone resin, epoxy resin or fluorinated or deuterated resin obtained from any of these resins, and further fluorene derivative resin. Preferably, these resin materials are used in the form of photosensitive resin containing a photosensitizer. Preferable are a photosensitive polyimide resin (raw material: a photosensitive polyamic acid resin or a photosensitive fluorinated polyamic acid resin) and a photosensitive fluorene derivative resin (raw material: a photosensitive fluorene derivative).

To form the under clad layer 5 on the substrate 12, for example, a varnish (resin solution) of any of the above resins is prepared and then coated over the substrate 12 by a method such as casting or spin coating. Thereafter, the coated varnish is dried and then heated as required. In the case of using a photosensitive resin, after the coating and the drying of the varnish, the coated varnish is exposed to light via a photomask and then heated as required. Thereafter, the exposed varnish is developed and then heated.

The under clad layer 5 thus formed has a thickness of, for example, 5 to 100 μm.

Then, in this method, as shown in FIG. 4(c), a core layer 6 is formed on the under clad layer 5.

Examples of the material that may be used to form the core layer 6 include resin materials having a higher refractive index than the resin material used for the under clad layer 5. Examples of the resin material include the same resin materials as those mentioned above.

To form the core layers 6, for example, a varnish (resin solution) of any of the above resins is prepared, and the varnish is coated onto a surface of the under clad layer 5. Thereafter, the coated varnish is dried and cured as required. In the case of using a photosensitive resin, after the coating and drying of the varnish, the coated varnish is exposed to light via a photomask and then heated as required.

Each of the core layers 6 thus formed has a thickness of, for example, 5 to 100 μm and a width of, for example, 5 to 100 μm.

Then, in this method, as shown in FIG. 4(d), an over clad layer 7 is formed on the under clad layer 5 so as to cover the core layer 6.

The material that may be used to form the over clad layer 7 includes the same resin material as that used for the under clad layer 5. The under clad layer 5 and the over clad layer 7 can be formed of the same resin material or of different resin materials.

To form the over clad layer 7 on the under clad layer 5, for example, a varnish (resin solution) of any of the above resins is prepared and then coated over the under clad layer 5 including the core layer 6 by a method such as casting or spin coating. Thereafter, the coated varnish is dried and then heated as required. In the case of using a photosensitive resin, after the coating and drying of the varnish, the coated varnish is exposed to light via a photomask and then heated as required. Thereafter, the exposed varnish is developed and then heated.

The over clad layer 7 thus formed has a thickness of, for example, 5 to 100 μm.

Thereafter, in this method, as shown in FIG. 4(e), the substrate 12 is removed. For example, etching or peeling is used to remove the substrate 12.

Thus, the film 2 including the under clad layer 5 and the over clad layer 7, and the core layer 6 covered by these layers is prepared.

Then, in this method, as shown in FIG. 3(b), an adhesive layer 3 is formed on the lower surface of the under clad layer 5.

The adhesive layer 3 is formed of an adhesive composition, and examples of the adhesive composition include an acrylic adhesive composition.

The acrylic adhesive composition contains, for example, an acrylic polymer.

The acrylic polymer is obtained by polymerizing an acrylic monomer which mainly contains alkyl(meth)acrylate and also contains the other component(s) such as reactive functional group-containing vinyl monomer having a reactive functional group.

The alkyl(meth)acrylate is alkyl methacrylate and/or alkyl acrylate, and examples thereof include alkyl(meth)acrylate (having linear or branched alkyl moiety having 4 to 18 carbon atoms) such as butyl(meth)acrylate, isobutyl(meth)acrylate, sec-butyl(meth)acrylate, t-butyl(meth)acrylate, pentyl(meth) acrylate, neopentyl(meth)acrylate, isopentyl (meth)acrylate, hexyl(meth)acrylate, heptyl(meth)acrylate, octyl(meth)acrylate, 2-ethylhexyl(meth)acrylate, isooctyl(meth)acrylate, nonyl(meth)acrylate, isononyl(meth)acrylate, decyl(meth) acrylate, isodecyl(meth)acrylate, undecyl(meth)acrylate, dodecyl(meth)acrylate, tridecyl(meth)acrylate, tetradecyl (meth)acrylate, pentadecyl(meth)acrylate, hexadecyl(meth) acrylate, heptadecyl(meth)acrylate, octadecyl(meth)acrylate (stearyl(meth)acrylate), and isooctadecyl(meth)acrylate (isostearyl(meth)acrylate). These alkyl(meth)acrylates can be used alone or in combination of two or more kinds.

The amount of the alkyl(meth)acrylate is, for example, from 85 to 99.5 parts by weight per 100 parts by weight of the acrylic monomer.

Examples of the reactive functional group-containing vinyl monomer include carboxyl group-containing vinyl monomer, and examples of the carboxyl group-containing vinyl monomer include unsaturated carboxylic acids such as (meth)acrylic acid, fumaric acid, maleic acid, itaconic acid, crotonic acid and cinnamic acid; unsaturated dicarboxylic acid anhydrides such as fumaric anhydride, maleic anhydride and itaconic anhydride; unsaturated dicarboxylic acid monoesters such as monomethyl itaconate, monobutyl itaconate and 2-acryloyloxyethyl phthalate; unsaturated tricarboxylic acid monoesters such as 2-methacryloiloxyethyl trimellitate and 2-methacryloiloxyethyl pyromellitate; and carboxyalkyl acrylate such as carboxyethyl acrylate and carboxypentyl acrylate.

In addition to the above carboxyl group-containing vinyl monomers, examples of the reactive functional group-containing vinyl monomer include epoxy group-containing vinyl monomers such as glycidyl (meth)acrylate and methyl glycidyl(meth)acrylate; hydroxyl group-containing vinyl monomers such as 2-hydroxyethyl acrylate, 2-hydroxypropyl acrylate, 2-hydroxybutyl acrylate, 4-hydroxybutyl acrylate, (meth)acrylic acid ethylene glycol, and (meth)acrylic acid propylene glycol; amide group-containing vinyl monomers such as (meth)acrylamide, N,N-dimethyl(meth)acrylamide, N,N-diethyl(meth)acrylamide, N-isopropyl(meth)acrylamide, N-butyl (meth)acrylamide, N-methoxymethyl(meth) acrylamide, N-methylol(meth)acrylamide, N-methylolpropane(meth)acrylamide and N-vinylcarboxylic acid amide; amino group-containing vinyl monomers such as dimethylaminoethyl(meth)acrylate and t-butylaminoethyl(meth) acrylate; cyano group-containing vinyl monomers such as acrylonitrile and methacrylonitrile; maleimide-based imide group-containing vinyl monomers such as N-cyclohexylmaleimide, N-isopropylmaleimide, N-laurylmaleimide and N-phenylmaleimide; itaconimide-based imide group-containing vinyl monomers such as N-methylitaconimide, N-ethylitaconimide, N-butylitaconimide, N-octylitaconimide, N-2-ethylhexylitaconimide, N-cyclohexylitaconimide and N-laurylitaconimide; succinimide-based imide group-containing vinyl monomers such as N-(meth)acryloyloxymethylenesuccinimide, N-(meth)acryloyl-6-oxyhexamethylenesuccinimide and N-(meth)acryloyl-8-oxyoctamethylenesuccinimide; sulfonic acid group-containing vinyl monomers such as styrenesulfonic acid, allylsulfonic acid, 2-(meth)acrylamide-2-methylpropanesulfonic acid, (meth)acrylamidepropanesulfonic acid, sulfopropyl(meth)acrylate and (meth)acryloyloxynaphthalenesulfonic acid; and isocyanate group-containing vinyl monomers such as 2-methacryloiloxyethyl isocyanate.

Among these reactive functional group-containing vinyl monomers, a carboxyl group-containing vinyl monomer and a hydroxyl group-containing vinyl monomer are preferable.

The amount of the reactive functional group-containing vinyl monomer is, for example, from 0.5 to 15 parts by weight per 100 parts by weight of the acrylic monomer.

The acrylic adhesive composition is obtained by solution polymerization of any of the above acrylic monomers in an organic solvent in the presence of an initiator.

The organic solvent may dissolve the acrylic monomer, and examples thereof include aliphatic carboxylic esters such as ethyl acetate and butyl acetate; aromatic hydrocarbons such as toluene, xylene and benzene; and aliphatic hydrocarbons such as pentane hexane and heptane. These organic solvents can be used alone or in combination of two or more kinds. An aliphatic carboxylic ester is preferable.

The amount of the organic solvent is, for example, 200 parts by weight or less per 100 parts by weight of the acrylic monomer.

Examples of the initiator include thermal polymerization initiator and photopolymerization initiator, and a thermal polymerization initiator is preferable. Examples of the thermal polymerization initiator include peroxide-based initiators such as benzoyl peroxide and lauroyl peroxide; and azo-based initiators such as 2,2'-azobis(isobutyronitrile) and azobis(2-methyl butyronitrile). These initiators can be used alone or in combination of two or more kinds. Among the initiators, an azo-based initiator is preferable.

The amount of the initiator is, for example, from 0.05 to 1 part by weight per 100 parts by weight of the acrylic monomer.

The acrylic monomer, the organic solvent and the initiator are mixed, and then heated as required. The heating temperature (polymerization temperature) is set in the range of, for example, 5 to 60° C. The polymerization time is set in the range of, for example, 1 to 30 hours.

This solution polymerization can give an acrylic adhesive composition in the form of an acrylic polymer solution with an acrylic polymer dissolved in the organic solvent.

The acrylic adhesive composition can also be obtained in the form of an acrylic polymer solution by polymerizing any of the above acrylic monomers by a method such as bulk polymerization without using an organic solvent, grinding the resulting polymer, and thereafter dissolving the grinded polymer in the organic solvent.

The acrylic adhesive composition contains an additive such as a crosslinking agent as required.

Examples of the crosslinking agent include polyisocyanate or a derivative thereof. Examples of the polyisocyanate derivative include modified polyisocyanates including polyols (e.g., trimethylolpropane), carbodiimides, biurets, allophanates or multimers (polynuclears with dimers or higher multimers). Preferable examples of the crosslinking agent include a trimethylolpropane-modified tolylene diisocyanate (adduct). These crosslinking agents can be used alone or in combination of two or more kinds.

The amount of the crosslinking agent is, for example, from 0.5 to 5 parts by weight per 100 parts by weight of the solid content of the acrylic adhesive composition.

Thereafter, the acrylic polymer solution thus obtained is coated onto a treated surface of a release film subjected to release treatment such as silicone treatment. Subsequently, the coated solution is heated to dry, thereby forming the adhesive layer 3 on the treated surface thereof. The heating conditions are, for example, in the range of 80 to 150° C. for 1 to 10 minutes.

Thereafter, the adhesive layer 3 formed on the release film is transferred onto the lower surface of the under clad layer 5, and the release film is removed from the adhesive layer 3.

The adhesive layer 3 thus formed has a thickness of, for example, 10 µm or more, preferably 20 µm or more, and usually 400 µm or less.

Then, in this method, as shown in FIG. 3(c), projection precursors 8 are formed on the surface (lower surface) of the adhesive layer 3.

The projection precursors 8 are formed of, for example, a curable resin composition containing a curable resin and an initiator.

The curable resin is, for example, a resin which is curable and polymerizable by heat or light, and examples thereof include epoxy resin, polyimide (thermosetting polyimide), phenol resin, urea resin, melamine resin, unsaturated polyester resin, diallyl phthalate resin, silicone resin and urethane resin (thermosetting urethane resin). An epoxy resin is preferable.

Examples of the epoxy resin include alicyclic epoxy resin, aromatic epoxy resin and nitrogen-containing cyclic epoxy resin, and an alicyclic epoxy resin is preferable.

Examples of the alicyclic epoxy resin include hydrogenated bisphenol A epoxy resins and 3,4-epoxycyclohexenyl-methyl-3',4'-epoxycyclohexene carboxylate. These curable resins can be used alone or in combination of two or more kinds.

Examples of the initiator include thermal polymerization initiator and photopolymerization initiator, and a photopolymerization initiator is preferable from the viewpoint of retention of shape of the projection precursors 8 during curing or polymerization. Examples of the photopolymerization initiator include photo-acid generators, and specific examples thereof include onium salts such as diazonium salt, sulfonium salt, iodonium salt, phosphonium salt and selenium salt. Further, examples of the counter ion thereto include anions such as $CF_3SO_3-$, $BF_4-$, $PF_6-$, $AsF_6-$ and $SbF_6-$. Examples of the photo-acid generator include sulfonium salts with $SbF_6-$, more specifically, 4,4'-bis[di(β-hydroxyethoxy)phenylsulfinio]phenylsulfid-bi s-hexafluoro antimonate. These initiators can be used alone or in combination of two or more kinds.

The amount of the initiator is, for example, 0.1 to 10 parts by weight per 100 parts by weight of the curable resin.

The curable resin and the initiator are mixed to prepare a curable resin composition. The curable resin composition can also be prepared as a varnish of the curable resin composition that is mixed with a diluent (e.g., propione carbonate) at an appropriate ratio.

Then, the curable resin composition (or the varnish thereof) thus prepared is coated, for example, using an automatic dispensing device.

The automatic dispensing device is provided at least with a syringe, an arm which movably supports the syringe, and a pump which controls the amount dispensed from the syringe, and examples thereof include SHOTMASTER 300 (fully automatic dispenser, manufactured by Musashi Engineering, Inc.).

The coating conditions of the curable resin composition (or the varnish thereof) include distance between the front end portion of the syringe and the surface of the adhesive layer 3 in the range of, for example, from 10 to 100 µm, and dispensing pressure (discharge pressure) in the range of, for example, from 0.01 to 1 MPa. Further, the inner diameter of the syringe is, for example, 0.1 to 0.3 µm, and the dispensing time (coating time for each of the projection portions 4) is, for example, from 0.05 to 0.5 seconds.

The coating of the curable resin composition (or the varnish thereof) can thus form the projection precursors 8 on the lower surface (the upper surface of the adhesive layer 3 when the film 2 is vertically inverted) of the adhesive layer 3 so as to be aligned and arranged at spaced intervals to one another.

Then, in this method, as shown in FIG. 3(d), the projection precursors 8 are cured to form a plurality of projection portions 4.

The projection precursors 8 are cured, for example, by heat or light. The projection precursors 8 are preferably cured by light.

Examples of the light include visible light, ultraviolet light, electron rays (e.g., X rays, α rays, β rays and γ rays), and ultraviolet light is preferable. The dose of the ultraviolet light is, for example, from 10 to 10000 $mJ/cm^2$.

After the curing, the projection precursors 8 are heated as required. The temperature of the heating after the curing is, for example, from 80 to 150° C., and the heating time is, for example, from 10 to 120 minutes.

Each of the projection portions 4 thus formed has a maximum thickness (cf. FIG. 1) T of 10 to 100 µm, or preferably 20 to 90 µm, and a diameter (cf. FIG. 1) D of, for example, 100 to 1000 µm, or preferably 200 to 800 µm, and a spacing (cf.

FIG. 1) L between each of the projection portions 4 is, for example, from 2 to 10 mm, or preferably from 3 to 8 mm.

The projection portions 4 are provided at a proportion of, for example, 0.1 to 10%, or preferably 0.5 to 5% per unit area ($cm^2$) of the adhesive layer 3.

Therefore, the optical waveguide film 1 can be obtained.

In the optical waveguide film 1, the initial adhesive strength of the adhesive layer 3 formed with the projection portions 4 described in detail in the following EXAMPLES is, for example, 0.5 N/cm or less, or preferably 0.2 N/cm or less and usually 0.1 N/cm or more while the adhesive strength after press-bonding of the adhesive layer 3 formed with the projection portions 4 is, for example, 1 N/cm or more, or preferably 1.2 N/cm or more and usually 3 N/cm or less.

Next, a method for fixing the optical waveguide film 1 to an optical substrate 9 is described with reference to FIG. 1.

In this method, the optical waveguide film 1 is fixed to the optical substrate 9 (indicated by phantom lines) provided with an optical element (not shown).

In the fixation of the optical waveguide film 1 to the optical substrate 9, first, the lower surface (the lower surface exposed from the projection portions 4) of the adhesive layer 3 is once brought into contact (initial adhesion) with the upper surface of the optical substrate 9, while the optical waveguide film 1 is positioned to the optical substrate 9 from above so as to adjoin the optical element.

Then, when the optical waveguide film 1 is positioned to the optical substrate 9 so that the connecting portion of the core layer 6 is optically connected with the connecting portion of the optical element, the optical waveguide film 1 being positioned is fixed onto the optical substrate 9 by press-bonding the optical waveguide film 1 downward.

On the contrary, when the optical waveguide film 1 is not positioned to the optical substrate 9, the optical waveguide film 1 is pulled upward to remove the adhesive layer 3 from the optical substrate 9. Then, the optical waveguide film 1 is positioned (corrected its position) to the optical substrate 9, and the lower surface of the adhesive layer 3 is brought into contact with the upper surface of the optical substrate 9. Thereafter, when the optical waveguide film 1 is positioned to the optical substrate 9 so that the connecting portion of the core layer 6 is optically connected with the connecting portion of the optical element, the optical waveguide film 1 is then fixed onto the optical substrate 9. However, when the optical waveguide film 1 is still not positioned to the optical substrate 9, the peeling and the adhesion as described above are repeated.

When the optical waveguide film 1 is initially adhered to the optical substrate 9, the lower surface of the adhesive layer 3 formed with the projection portions 4 is brought into contact with the optical substrate 9, so that the initial adhesive strength can be reduced. Specifically, in the initial adhesion to the optical substrate 9, the projection portions 4 interposes between the surface of the adhesive layer 3 covering the projection portions 4 and the optical substrate 9, resulting in reduction of the initial adhesive strength of the adhesive layer 3. In particular, the aligned and arranged projection portions 4 can uniformly reduce the initial adhesive strength of the adhesive layer 3.

Therefore, peeling during positioning can be facilitated to achieve excellent positioning accuracy.

When the adhesive layer 3 is adhered to the optical substrate 9 after the initial adhesion, the surface of the adhesive layer 3 exposed from the plurality of projection portions 4 that are arranged at spaced intervals to one another can secure sufficient adhesive strength. Specifically, in the adhesion to the optical substrate 9 after the initial adhesion, as the optical waveguide film 1 is pressed downward, the projection portions 4 are urged downward against the optical substrate 9 and also urged upward from the optical substrate 9 by the reaction. Due to the urging from the optical substrate 9, the projection portions 4 are entered into the adhesive layer 3 (cf. phantom lines in FIG. 1). This increases the surface area of the adhesive layer 3 that can contact with the optical substrate 9, so that the adhesive layer 3 can secure sufficient adhesive strength. In particular, since the projection portions 4 are aligned and arranged, sufficient adhesive strength can be secured over the entire lower surface of the adhesive layer 3.

Therefore, in the adhesion after the initial adhesion, the film 2 can be securely fixed onto the optical substrate 9.

Furthermore, since the adhesive layer 3 is formed with a hardness that allows the surface thereof to support the projection portions 4, the flowage of the adhesive layer 3 is suppressed in the initial adhesion to the optical substrate 9, thereby preventing the adhesive layer 3 from blocking the optical path in the core layer 6.

Therefore, during the positioning, adhesion and peeling of the film 2 to/from the optical substrate 9 are repeated to adjust the arrangement of the film 2 to the optical substrate 9, so that the positioning can be achieved with excellent positioning accuracy. In addition, after the positioning, the film 2 can be securely fixed onto the optical substrate 9 and, further, excellent connection reliability can be ensured.

The mode of the alignment is not limited as long as the projection portions 4 are aligned and arranged on the surface of the adhesive layer 3, and the projection portions 4 can be aligned and arranged in an appropriate pattern such as a grid pattern or a staggered pattern.

In the above explanation, the adhesive layer 3 formed with the projection portions 4 is provided only on the lower surface of the under clad layer 5. However, in addition to the lower surface of the under clad layer 5, the adhesive layer 3 can also be provided on the upper surface of the over clad layer 7.

Furthermore, although not shown, for example, the adhesive layer 3 can be provided not on the lower surface of the under clad layer 5, but only on the upper surface of the over clad layer 7.

EXAMPLES

The present invention will now be described in more detail by way of Examples and Comparative Example. However, the present invention is not limited to the following Examples and Comparative Example. In the following description, the units "part(s)" and "%" are by weight, unless otherwise noted.

Example 1

Preparation of Acrylic Adhesive Composition

To a four-neck flask equipped with a condenser tube, a nitrogen introducing tube, a thermometer and a stirrer, 100 parts of butyl acrylate, 1 part of acrylic acid, 0.3 parts of 4-hydroxybutyl acrylate, 0.1 parts of 2,2'-azobis(isobutyronitrile) and 200 parts of ethyl acetate were added, and nitrogen gas was introduced into the flask for 1 hour with gently stirring. Subsequently, while nitrogen gas was introduced thereinto, the mixture was polymerized for 10 hours with the solution temperature in the flask kept at 55 to 60° C.

One part of a trimethylolpropane-modified tolylene diisocyanate (Coronate L, manufactured by Nippon Polyurethane Industry Co., Ltd.) was added to 100 parts of the solid content of the acrylic polymer solution and then mixed with stirring, to prepare an acrylic adhesive composition.

Formation of Adhesive Layer

The acrylic adhesive composition was coated onto a surface of a 38-μm-thick release film (made of PET, manufactured by Toray Industries, Inc.) subjected to silicone treatment (release treatment). Thereafter, the coated product was put into a dryer at 130° C. for 3 minutes to dry, thereby forming a 100-μm-thick adhesive layer on the treated surface of the release film.

Production of Film

First, a substrate (200×300 mm in size) made of a 25-μm-thick stainless steel was prepared (cf. FIG. 4(a)). Then, a fluorene derivative varnish A was prepared according to the formulation shown in Table 1. The fluorene derivative varnish A thus prepared was coated onto a surface of the stainless steel substrate, and the coated varnish was heated at 100° C. for 15 minutes to dry. Thereafter, the dried varnish was exposed to light via a photomask and then developed. The developed varnish was heated at 100° C. for 20 minutes to be cured, thereby forming an under clad layer on the stainless steel substrate (cf. FIG. 4(b)). The under clad layer had a refractive index of 1.585 at a wavelength of 633 nm. The under clad layer had a thickness of 20 μm.

Further, a fluorene derivative varnish B was prepared according to the formulation shown in Table 1. The fluorene derivative varnish B thus prepared was coated onto a surface of the under clad layer, and the coated varnish was heated at 100° C. for 30 minutes to dry. Thereafter, the dried varnish was exposed to light via a photomask. After the exposure, the varnish was heated at 100° C. for 60 minutes and then developed. Subsequently, the developed varnish was heated at 100° C. for 10 minutes to be cured, thereby forming a core layer on the under clad layer (cf. FIG. 4(c)). The core layer had a refractive index of 1.615 at a wavelength of 633 nm. The core layer had a thickness of 5 μm and a width of 5 μm.

The fluorene derivative varnish A was then coated onto a surface of the under clad layer containing the core layer, and the coated varnish was heated at 100° C. for 15 minutes to dry. Thereafter, the dried varnish was exposed to light via a photomask and then developed. The developed varnish was heated at 100° C. for 20 minutes to be cured, thereby forming an over clad layer on the under clad layer so as to cover the core layer (cf. FIG. 4(d)). The over clad layer had a refractive index of 1.585 at a wavelength of 633 nm. The over clad layer had a thickness of 20 μm.

Thereafter, the stainless steel substrate was removed by etching (cf. FIG. 4(e)).

Therefore, a film including the under clad layer, the core layer and the over clad layer was prepared.

TABLE 1

|  | Varnish | (w/t part) |
| --- | --- | --- |
|  | A | B |
| Fluorene Derivative-1 *1 | 83 | 67 |
| Fluorene Derivative-2 *2 | — | 33 |
| Diluent *3 | 17 | — |
| Photo-Acid Generator *4 | 1 | 1 |

*1: Bisphenoxyethanolfluorene diglycidyl ether
*2: Bisphenolfluorene diglycidyl ether
*3: 3,4-epoxycyclohexenylmethyl-3',4'-epoxycyclohexenecarboxylate (CELLOXIDE 2021P, manufactured by DAICEL CHEMICAL INDUSTRIES, LTD.)
*4: 50% propionic carbonate solution of 4,4'-bis[di(β-hydroxyethoxy)phenylsulfinio] phenylsulfid-bis-hexafluoroantimonate Formation of Adhesive Layer The lower surface of the under clad layer in the film was bonded to the upper surface (the upper surface opposite to the lower surface in contact with the release film) of the adhesive layer, and the release film was then removed from the adhesive layer (cf. FIG. 3(b)).

Formation of Projection Precursors

One part of a 50% 4,4'-bis[di(β-hydroxyethoxy)phenylsulfinio]phenylsulfid-bi s-hexafluoro antimonite of propione carbonate solution was mixed with 70 parts of a hydrogenated bisphenol A epoxy resin (ADEKA RESIN EP-4080, manufactured by ADEKA Corporation) and 30 parts of 3,4-epoxycyclohexenylmethyl-3',4'-epoxycyclohexene carboxylate (CELLOXIDE 2021P, manufactured by Daicel Chemical Industries, Ltd.) with stirring, to prepare a varnish of a curable resin composition.

Then, the varnish of the curable resin composition thus prepared was coated onto a surface (upper surface) of the adhesive layer in the optical waveguide film that was vertically inverted, with the use of a fully automatic dispenser (automatic dispensing device, SHOTMASTER 300, manufactured by Musashi Engineering, Inc.). As the coating conditions of the fully automatic dispenser, the distance between the front end portion of the syringe and the adhesive layer was set to 40 μm; the discharge pressure, to 0.08 MPa; and the discharge (coating) time for each projection portion (coating time for each projection portion), to 0.2 seconds. The syringe had an inner diameter of 0.12 μm.

Therefore, projection precursors were formed on the surface of the adhesive layer (cf. FIG. 3(c)).

Formation of Projection Portions

Ultraviolet light was irradiated onto the projection precursors thus formed at a dose of 2000 mJ/cm$^2$ from above to be cured. After the curing, the projection precursors were heated at 120° C. for 30 minutes, thereby forming a plurality of projection portions arranged on a surface of the adhesive layer so as to be aligned in a grid pattern at spaced intervals to one another. Each of the projection portions had a thickness of 80 μm and a diameter of 740 μm. The spacing between each of the projection portions was 3.3 mm and the proportion (proportion occupied) of the projection portions per unit area of the adhesive layer was 3.6%.

Therefore, an optical waveguide film including the film, the adhesive layer and the projection portions was formed.

Example 2

In the same manner as in Example 1, except that 100 parts of the hydrogenated bisphenol A epoxy resin was used in place of 70 parts of the hydrogenated bisphenol A epoxy resin and 3,4-epoxycyclohexenylmethyl-3',4'-epoxycyclohexene carboxylate was not used, a varnish of a curable resin composition was prepared, projection precursors were formed, and subsequently, projection portions were formed to give an optical waveguide film. As the coating conditions of the fully automatic dispenser, the discharge time was set to 0.08 seconds. Each of the projection portions had a thickness of 42 μm and a diameter of 530 μm. The spacing between each of the projection portions was 3.4 mm and the proportion of the projection portions per unit area of the adhesive layer was 1.8%.

Example 3

In the same manner as in Example 1, a varnish of a curable resin composition was prepared, projection precursors were formed, and subsequently, projection portions were formed to give an optical waveguide film. As the coating conditions of the fully automatic dispenser, the discharge time was set to 0.08 seconds. Each of the projection portions had a thickness of 28 μm and a diameter of 380 μm. The spacing between each of the projection portions was 3.6 mm and the proportion of the projection portions per unit area of the adhesive layer was 0.9%.

Comparative Example 1

An optical waveguide film was obtained in the same manner as in Example 1 except that the projection portions in Example 1 were not formed.

Evaluation

1) Initial Adhesive Strength

In the optical waveguide film obtained in each of Examples 1 to 3 and Comparative Example 1, the surface of the adhesive layer was brought into contact with the optical substrate made of silicon with a pressure of 1 kPa to be bonded together. Then, one end of the optical waveguide film was peeled off in a direction 90° relative to the optical substrate at a rate of 50 mm/min to measure the resistance. In this measurement, the resistance was not measured until the optical waveguide film was peeled off to 10 mm from the end thereof. When exceeding 10 mm, the measurement was started to determine the minimum resistance as an initial adhesive strength. The results are shown in Table 2.

2) Adhesive Strength after Press-Bonding (90° Peel Test)

In each of Examples 1 to 3 and Comparative Example 1, the adhesive layer was bonded to the optical substrate made of silicon using a roll with a pressure of 400 kPa at a temperature of 130° C. After the optical waveguide film thus bonded was allowed to stand at 23° C. for 30 minutes, one end of the optical waveguide film was peeled off in a direction 90° relative to the optical substrate at a rate of 50 mm/min to measure the resistance (90° peel test). In the 90° peel test, the resistance was not measured until the optical waveguide film was peeled off to 10 mm from the end thereof. When exceeding 10 mm, the measurement was started to determine the minimum resistance as an adhesive strength after press-bonding. The results are shown in Table 2.

While the illustrative embodiments of the present invention are provided in the above description, such is for illustrative purpose only and it is not to be construed limitative. Modification and variation of the present invention which will be obvious to those skilled in the art is to be covered by the following claims.

What is claimed is:

1. An optical waveguide film comprising:
    a film comprising a clad layer and a core layer covered by the clad layer;
    an adhesive layer formed on at least one surface of the film; and
    a plurality of projection portions formed on a surface of the adhesive layer and arranged at spaced intervals to one another,
    wherein each of the projection portions is generally semi-elliptical in shape when viewed in a sectional view taken in a plane perpendicular to the surface of the adhesive layer,
    wherein the projection portions are formed as resins having substantially no residual tackiness,
    wherein the projection portions are formed by curing projection precursors made of a curable resin composition comprising a curable resin and an initiator, and
    wherein the curable resin is an epoxy resin.

2. The optical waveguide film according to claim 1, wherein the projection portions are aligned and arranged.

3. The optical waveguide film according to claim 1, wherein the adhesive layer is formed of an acrylic adhesive composition.

4. The optical waveguide film according to claim 1, wherein the adhesive layer has a storage modulus at 25° C. of 0.01 to 1.0 MPa.

5. The optical waveguide film according to claim 1, wherein the adhesive layer has a thickness of 10 μm or more.

6. The optical waveguide film according to claim 1, wherein an initial adhesive strength of the adhesive layer is 0.5 N/cm or less.

7. The optical waveguide film according to claim 1, wherein an adhesive strength after press-bonding of the adhesive layer formed with the projection portions is 1 N/cm or more.

TABLE 2

| | Adhesive Layer | Projection Portions | | | | Adhesive Strength After Press- |
|---|---|---|---|---|---|---|
| | Thickness (μm) | Thickness (μm) | Diameter (μm) | Proportion Occupied (%) *1 | Initial Adhesive Strength (N/cm) | Bonding (N/cm) |
| Ex. 1 | 100 | 80 | 740 | 3.6 | 0.1 | 1.57 |
| Ex. 2 | 100 | 42 | 530 | 1.8 | 0.12 | 1.40 |
| Ex. 3 | 100 | 28 | 380 | 0.9 | 0.15 | 1.65 |
| Comp. Ex. 1 | 100 | — | — | — | 1 | 2.5 |

*1: Proportion of the projection portions per unit area of the adhesive layer

3) Storage Modulus (G')

As for the adhesive layer formed in Example 1, a dynamic viscoelasticity measuring device (ARES, manufactured by TA Instruments Co., Ltd.) was used to determine a storage modulus at 25° C. by increasing the temperature from −20° C. to 200° C. at 5° C./min in torsion mode with a frequency of 1 Hz. The adhesive layer of Example 1 had a storage modulus at 25° C. of 0.1 MPa.

8. The optical waveguide film according to claim 1, wherein each of the projection portions is formed in a generally circular shape when viewed in a plan view.

9. The optical waveguide film according to claim 8, wherein the projection portions are arranged at spaced intervals to one another, having a maximum thickness of 10 to 100 μm and a diameter of 100 to 1000 μm, and a spacing between each of the projection portions is from 2 to 10 mm.

10. A method for manufacturing an optical waveguide film comprising the steps of:
- forming a film comprising a clad layer and a core layer covered by the clad layer;
- forming an adhesive layer on at least one surface of the film; and
- forming a plurality of projection portions on a surface of the adhesive layer so as to be arranged at spaced intervals to one another,
- wherein each of the projection portions is generally semi-elliptical in shape when viewed in a sectional view taken in a plane perpendicular to the surface of the adhesive layer,
- wherein the projection portions are formed as resins having substantially no residual tackiness,
- wherein the projection portions are formed by curing projection precursors made of a curable resin composition comprising a curable resin and an initiator, and
- wherein the curable resin is an epoxy resin.

11. The method of claim 10, wherein when the optical waveguide film is initially adhered to an optical substrate, the projection portions uniformly reduce an initial adhesive strength of the adhesive layer, and when the optical waveguide film is pressed down against the optical substrate to a final adhesion, the projection portions are urged to enter into the adhesive layer thereby to increase the surface area and adhesive strength.

12. The optical waveguide film according to claim 1, wherein when the optical waveguide film is initially adhered to an optical substrate, the projection portions uniformly reduce an initial adhesive strength of the adhesive layer, and when the optical waveguide film is pressed down against the optical substrate to a final adhesion, the projection portions are urged to enter into the adhesive layer thereby to increase the surface area and adhesive strength.

* * * * *